US008707283B2

(12) United States Patent
Jung et al.

(10) Patent No.: US 8,707,283 B2
(45) Date of Patent: Apr. 22, 2014

(54) PARALLEL DLL TREE INITIALIZATION

(75) Inventors: Kenneth M. Jung, Seattle, WA (US); Arun Kishan, Bellevue, WA (US); Neill M. Clift, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1635 days.

(21) Appl. No.: 11/693,102

(22) Filed: Mar. 29, 2007

(65) Prior Publication Data

US 2008/0244551 A1  Oct. 2, 2008

(51) Int. Cl.
*G06F 9/44* (2006.01)
(52) U.S. Cl.
USPC .......................................... 717/163
(58) Field of Classification Search
USPC .......................................... 717/163
See application file for complete search history.

(56) References Cited

U.S. PATENT DOCUMENTS

| 5,708,811 | A | 1/1998 | Arendt |
| 5,802,367 | A | 9/1998 | Held |
| 5,835,749 | A | 11/1998 | Cobb |
| 5,974,470 | A | 10/1999 | Hammond |
| 6,279,124 | B1 | 8/2001 | Brouwer et al. |
| 6,529,934 | B1 | 3/2003 | Kawamura et al. |
| 6,763,519 | B1 | 7/2004 | McColl et al. |
| 6,769,126 | B1 | 7/2004 | Pekowski |
| 7,047,529 | B2 | 5/2006 | Delo |
| 7,859,914 | B2 | 12/2010 | Kawabata et al. |
| 7,900,217 | B2 | 3/2011 | Jung et al. |
| 2002/0147903 | A1 | 10/2002 | Hubert et al. |
| 2004/0123308 | A1 | 6/2004 | Idoni |
| 2005/0055692 | A1 | 3/2005 | Lupini et al. |
| 2005/0102665 | A1 | 5/2005 | Barta et al. |
| 2005/0144608 | A1* | 6/2005 | Oyama et al. .................. 717/162 |
| 2006/0026584 | A1 | 2/2006 | Muratori |

OTHER PUBLICATIONS

"CreateRemoteThread," © 2007 Microsoft Corporation, <http://msdn2.microsoft.com/en-us/library/ms682437(d=printer).aspx> [retrieved Feb. 8, 2007], pp. 1-5.
Van Overbeek, T., "Initializing gnuwin DLLs," Feb. 23, 1998, <http://www.cygwin.com/ml/cygwin/1998-02/msg00699.html> [retrieved Feb. 8, 2007], pp. 1-2.
"Writing Stable Browser Extensions," © 2007 Microsoft Corporation, <http://msdn.microsft.com/workshop/browser/ext/overview/browser_ext_stability.asp> [retrieved Feb. 8, 2007], pp. 1-4.
International Search Report from corresponding International Application No. PCT/US2008/054378, filed Feb. 20, 2008.
European Search Report from European Patent Application 08730224 dated Mar. 9, 2010, pp. 1-6.

(Continued)

*Primary Examiner* — Andy Ho
*Assistant Examiner* — Timothy A Mudrick
(74) *Attorney, Agent, or Firm* — John Jardine; Micky Minhas

(57) ABSTRACT

A parallel processing method and apparatus for initializing libraries is disclosed. Libraries for an application are identified, an initialization order for the libraries is determined, and the libraries are initialized in asynchronous stages. The initialization order is determined by forming a library tree of the libraries' references and determining a load order for the references according to the levels of the references in the library tree. The asynchronous stages comprise a loading stage that includes a load queue, a snapping stage that includes a snap queue, and an initializing stage that includes an initialize queue.

20 Claims, 13 Drawing Sheets

(56) References Cited

OTHER PUBLICATIONS

Int. Preliminary Report on Patentability cited in PCT Application No. PCT/US2008/054378 dated Sep. 29, 2009, 8 pg.
Reply to first Chinese Office Action cited in Chinese Application No. 200880010758.6 dated Jun. 14, 2012, 16 pgs.
Second Chinese Office Action cited in Chinese Application No. 200880010758.6 dated Oct. 8, 2012, 10 pgs.
Reply to EP Communication cited in EP Application No. 08730224.6 dated Nov. 5, 2010, 15 pgs.
First Chinese Office Action cited in related application No. 200880010758.6 dated Feb. 16, 2012, pp. 1-8.
First European Office Action cited in related application No. 08730224.6 dated Jun. 10, 2010, pp. 1-5.
Final Chinese Office Action cited in Chinese Application No. 200880010758.6 dated May 6, 2013, 8 pgs.

* cited by examiner

PARALLEL DLL TREE INITIALIZATION

BACKGROUND

Computing devices perform tasks by executing computing instructions. A set of computing instructions for performing a particular task form a function. A set of functions that interact when performing related tasks form an application. Two or more different applications may need to use the same function to perform the same task. While it is possible to include the same function's computing instructions in each of the applications, it is more efficient for each application to share a common set of computing instructions. By sharing a common set of computing instructions, less memory is used to store instructions, and modifications to the computing instructions need only be made in one place.

To allow more than one application to use the same functions, a library of functions, i.e., a library, is formed. Typically, each function's computing instructions and a reference to the computing instructions are placed in a library. To use a function in a library, an application invokes an operating system module that loads the library and the application calls a desired function using the reference to the function. Usually, before a loaded library can be accessed, the library must be initialized. Initialization includes executing computing instructions that, for example, build and prepare data structures used by the library.

Functions may call other functions in the same library. Functions may also call functions in another library. Hence, it is possible for a library to depend on another library. For example, an application may depend on library A that depends on library B which depends on library C. In order to load and initialize the application, libraries A, B, and C must be loaded and initialized in the proper order. The application and its libraries are typically loaded in the order that the application and libraries are discovered, i.e. in top down order. For example, the application is loaded first, then library A, then library B, etc. The application and its libraries are typically are initialized in bottom up order.

Traditionally, the process of loading and initializing libraries described above is a serial process. That is, each library must be loaded and initialized one after the other in the appropriate order. Loading and initializing can be speeded up by taking advantage of parallel processing techniques such as multithreaded processing and parallel processing hardware such as multiprocessor computing devices and multicore microprocessors.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A parallel processing method and apparatus for initializing libraries that support an application are disclosed. Libraries that support the application are identified. An initialization order for the supporting libraries is determined. The libraries are initialized in asynchronous stages.

In one exemplary from, determining an initialization order for the supporting libraries comprises: forming a library tree of the references for the supporting libraries; and determining a load order for reference sets according to the levels of the reference sets in the library tree.

In one exemplary form, the asynchronous stages comprise: an asynchronous loading stage that uses a load queue; an asynchronous snapping stage that uses a snap queue; and an asynchronous initializing stage that uses an initialize queue. Preferably, the asynchronous loading stage that uses a load queue: loads the reference sets of the library tree into the load queue according to the load order; loads libraries into the application's process memory space using the library references in the load queue; and moves the library references for the loaded libraries from the load queue to the snap queue. Preferably, the asynchronous snapping stage that uses a snap queue: snaps libraries using the library references in the snap queue; and moves the library references for the snapped libraries from the snap queue to the initialize queue. Preferably, the asynchronous initializing stage that uses an initialize queue executes the initialization computing instructions for the libraries referred to by the library references in the initialize queue.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
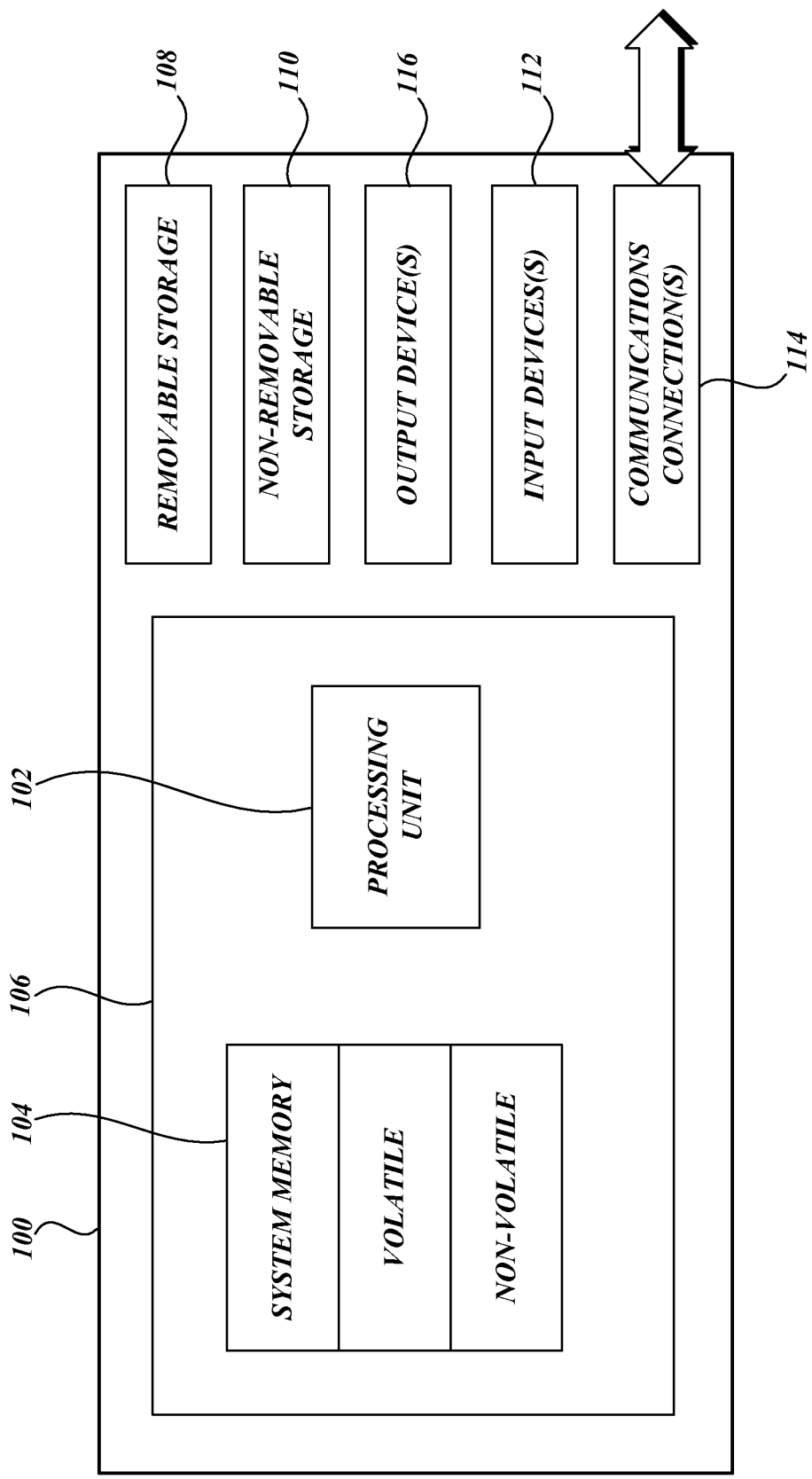
FIG. 1 is a block diagram on an exemplary computing device suitable for performing parallel library tree initialization.

Libraries are ordered collections of computer software functions that enable more than one software program to use the functions. By making the same functions available to multiple software programs, less memory is used to store function computing instructions. At least as important, if a function needs to be modified, the modification can be done in one software module, i.e., the library, instead of many software modules, i.e., the programs. A function in a library is referred to as a "library function." Typically, each library functions' computing instructions and a reference to each functions' computing instructions are placed in a library. Before a library function's computing instructions can be executed by, for example, an application, the library containing the library function must be located, loaded, and initialized. Initialization usually involves executing instructions that prepare, for example, data structures used by the library functions. Normally, a software module in an operating system called a "loader" provides library location, loading, and initialization.

Often, a first library function in a first library calls a second library function in a second library. In such situations, the first library depends on the second library. That is, the first library is a dependent library of the second library. Stated conversely, the second library supports the first library. That is, the second library is a supporting library of the first library. For example, an application may depend on library A, which depends on library B, which depends on library C. In this example, library C supports library B which support library A and all three libraries, directly or indirectly, support the application that called the first library.

The dependency relationships described above can be represented in a tree structure, i.e., a library dependency tree or library tree. In a library tree, a node is inserted for each library. Each dependency relationship is represented by a link between the dependent library and the supporting library.

In order to load and initialize the application, libraries A, B, and C must be loaded and initialized in the proper order. The application and its libraries are typically loaded in the order that the application and libraries are discovered, i.e. in top down order. For example, the application is loaded first, then library A, then library B, etc. The application and its libraries are typically are initialized in bottom up order.

During loading, a library is parsed. If, during the parsing of the library, no supporting libraries are discovered, i.e., the library does not depend on other libraries, the loading of the library continues until the loading of the library is completed. If, during the parsing of the library, one or more dependencies are discovered, the loading of the library is paused and supporting libraries are loaded. After the supporting libraries are loaded, the library continues until the loading of the library is completed.

During the loading stage, as each library is parsed, a dependency tree is assembled. For each supporting library, a node is inserted in the dependency tree linked beneath the library that the supporting library supports.

As soon as a library's supporting libraries are loaded, the library can be snapped. The loader uses the dependency tree to determine the snapping order starting with the nodes at the bottom of the dependency tree. Hence, the snapping stage proceeds bottom-up, i.e., from the bottom of the dependency tree to the top of the dependency tree.

As soon as a library is snapped and library's supporting libraries are initialized, the library can be initialized. The loader uses the dependency tree to determine the initialization order starting with the nodes at the bottom of the dependency tree. Hence, the initialization stage proceeds bottom-up.

In the past, the loading and initializing process described above has been done in a linear, or serial, fashion. That is, each library is loaded and initialized, one after the other, with little or no time overlap. Using the example described above, the loading of library C is completed before library C is initialized. The loading of library B is not started until library C is completely loaded and initialized. The loading of library A is not started until library B is completely loaded and initialized, and so on. While effective, the serial loading and initialization of libraries is not as time efficient as it could be. The overall time to load and initialize libraries can be reduced by reducing the latency during loading and initializing.

The latency during loading and initializing can be reduced by taking advantage of parallel processing techniques such as multithreaded processing, multiprocessor computing devices, and multicore processors to exploit the inherent parallelism of library trees. A process that takes advantage of parallel processing techniques is a parallel processing process. "Parallel library tree initialization" is an exemplary parallel processing process. FIG. 1 is a block diagram that illustrates an exemplary computing device 100 suitable for performing parallel library tree initialization. Computing devices such as the exemplary computing device 100 include, but are not limited to, desktop computers, servers, laptop computers, handheld computing devices, embedded computing devices, etc.

The computing device 100 shown in FIG. 1 comprises a basic computing device 106 and various types of peripheral devices with which the basic computing device 106 interacts. The basic computing device 106 comprises a processing unit 102 for processing computing instructions and controlling the operation of the computing device 100 and a memory unit 104 for storing the computing instructions waiting to be immediately executed. The memory unit 104 may include system memory, volatile memory, and non-volatile memory. The processing unit 102 may be implemented as one microprocessor, a plurality of microprocessors, a multiple core microprocessor, a plurality of multiple core microprocessors, or other electronic circuitry capable of providing similar computing resources. The memory unit 104 may be implemented by memory devices such as, but not limited to, read-only memory (ROM), programmable read-only memory (PROM), electrically programmable read-only memory (EPROM), electrically erasable and programmable read-only memory (EEPROM), random-access memory (RAM), static random-access memory (SRAM), dynamic random-access memory (DRAM), flash memory or a combination of the aforementioned memory devices.

The basic computing device 106 shown in FIG. 1 may interact with one or more peripheral devices including, but not limited to, removable storage 108, non-removable storage 110, output device(s) 116, input device(s) 112, and communication connection(s) 114. Removable storage 108 devices enable the long term, portable storage of computing instructions and data and include, but are not limited to, removable magnetic disc drives and removable optical disc drives such as compact disc (CD) drives and digital video drives (DVD). Non-removable storage 110 devices enable the long term storage of computing instructions and data and include, but are not limited to, magnetic disc drives, optical disc drives, holographic storage units, and so on. Output device(s) 116 enable the computing device 100 to produce visual, audible, and other output and include, but are not limited to, liquid crystal displays (LCDs), plasma displays, cathode ray tube (CRT) displays, audio speakers, haptic gloves, haptic seats, digital projectors, and so on. Input device(s) 112 enable the computing device 100 to accept and process visual, audible, and other input and include, but are not limited to, mice, keyboards, electronic pens, microphones, digital cameras, digital video cameras, and so on. Communication connection(s) 114 include, but are not limited to, Ethernet, Token Ring, Fiber Distributed Data Interface (FDDI), Asynchronous Transfer Mode (ATM), Firewire connections, and so on.

Computing devices, such as the exemplary computing device 100 illustrated in FIG. 1 and described above, are often controlled by an operating system. An operating system controlled computing device provides an environment for parallel library tree initialization. A library tree contains nodes that represent libraries including dynamically linked libraries. An exemplary type of dynamically linked library is a dynamic-link library (DLL). A dynamically linked library, e.g., a DLL, is a library that is able to be loaded and initialized while the applications that use the DLL are running allowing the DLL to be loaded only when needed. Hence, a DLL does not consume memory until the DLL is used. Because a DLL is a separate file, the same DLL may be shared by more than one application and corrections or improvements can be made to only the DLL without affecting the operation of the calling program or other libraries. A library tree containing nodes that represent DLLs is a DLL tree. Hence, an implementation of parallel library tree initialization is parallel DLL tree initialization. Except where noted, hereinafter the terms "library" and "DLL" may be interchanged and the phrases "parallel library tree initialization" and "parallel DLL tree initialization" may also be interchanged, it being understood that the disclosed subject matter is not limited to DLLs but include other types of linked libraries, including statically loaded libraries.

Figure 2:
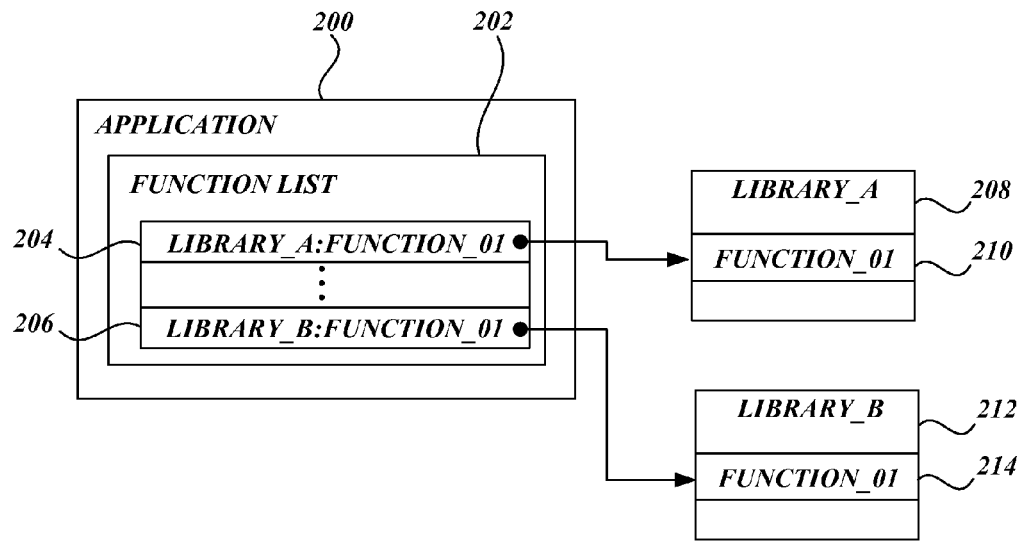
FIG. 2 is a block diagram of an exemplary application supported by exemplary libraries.
Figure 3:
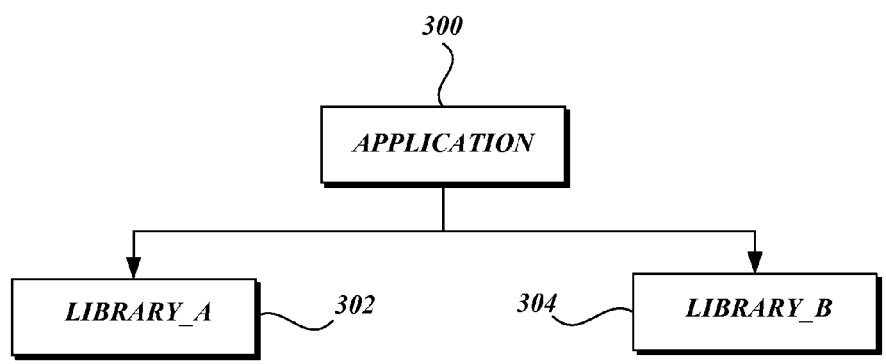
FIG. 3 is a block diagram of an exemplary dependency tree illustrating the dependence relationships of the elements shown in FIG. 2.

To assist in understanding the process of parallel library tree initialization, an explanation of library trees is provided below using FIGS. 2 through 5. FIG. 2 is a block diagram of an exemplary application 200 supported by exemplary libraries 208 and 212. FIG. 3 is a block diagram of an exemplary dependency tree, i.e., library tree, that represents the dependency relationships of the elements shown in FIG. 2, i.e., exemplary application 200 and exemplary libraries 208 and 212. In FIG. 2, the exemplary application 200 contains a function list 202. The function list 202 comprises two function pointers library_A:function_01 pointer 204 and library_B:function_01 pointer 206. Each of the two function pointers 204 and 206 refers to, i.e., points to, a particular function in a particular library. The library_A:function_01 pointer 204 points to function function_01 210 in library_A 208. The library_B:function_01 pointer 206 points to function function_01 214 in library_B 212.

The root node, i.e., top node, of the exemplary library tree shown in FIG. 3, is application 300 and is the node for application 200, shown in FIG. 2. Shown in FIG. 3, a directed link, represented by an arrow pointing down, connects application 300 with library_A 302 to show that application 200 depends on library_A 208, shown in FIG. 2. Similarly, a directed link connects application 300 with library_B 304 to show that application 200 depends on library_B 212.

Figure 4:
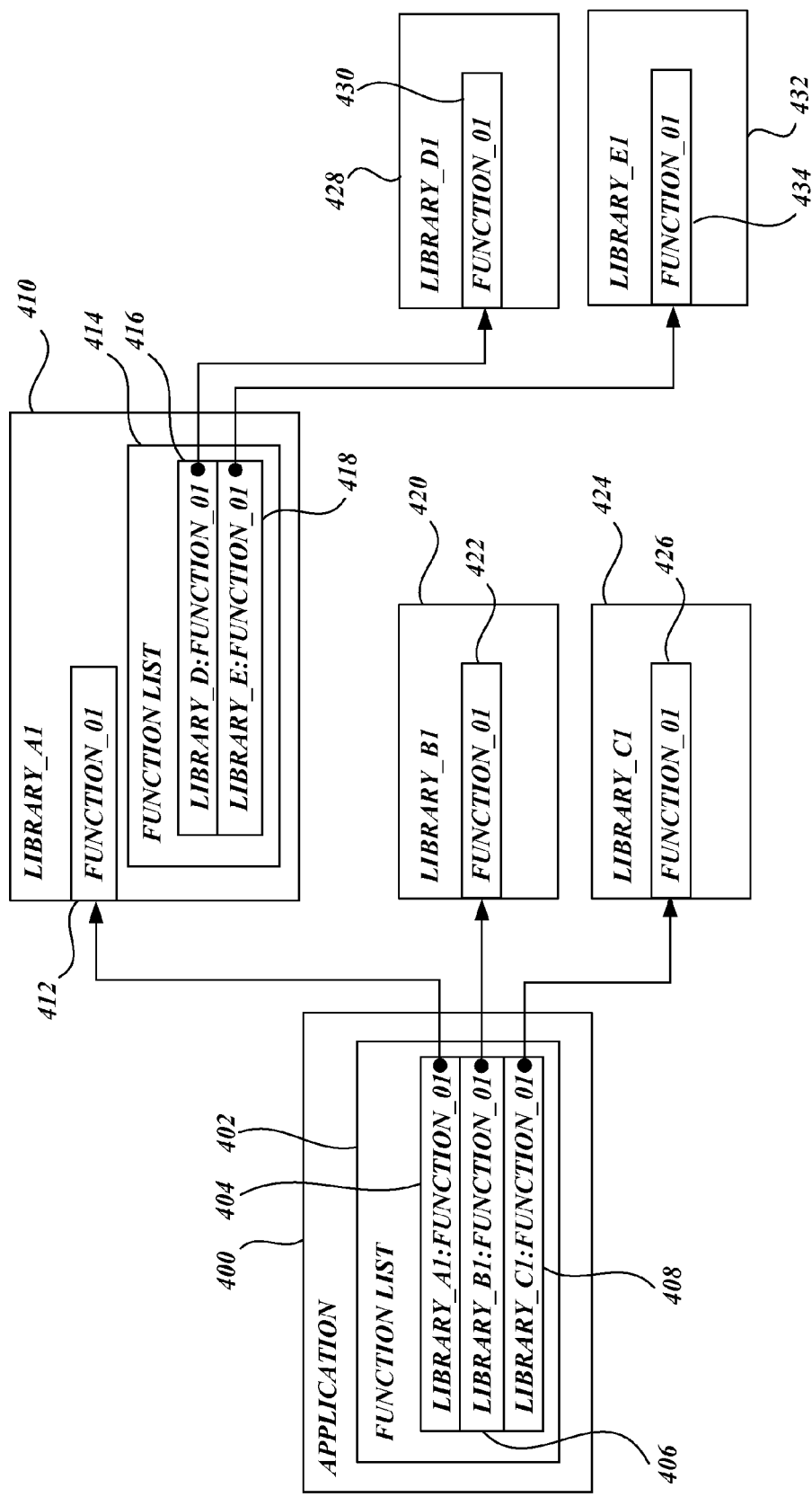
FIG. 4 is a block diagram of exemplary applications supported by exemplary libraries that are themselves supported by other exemplary libraries.
Figure 5:
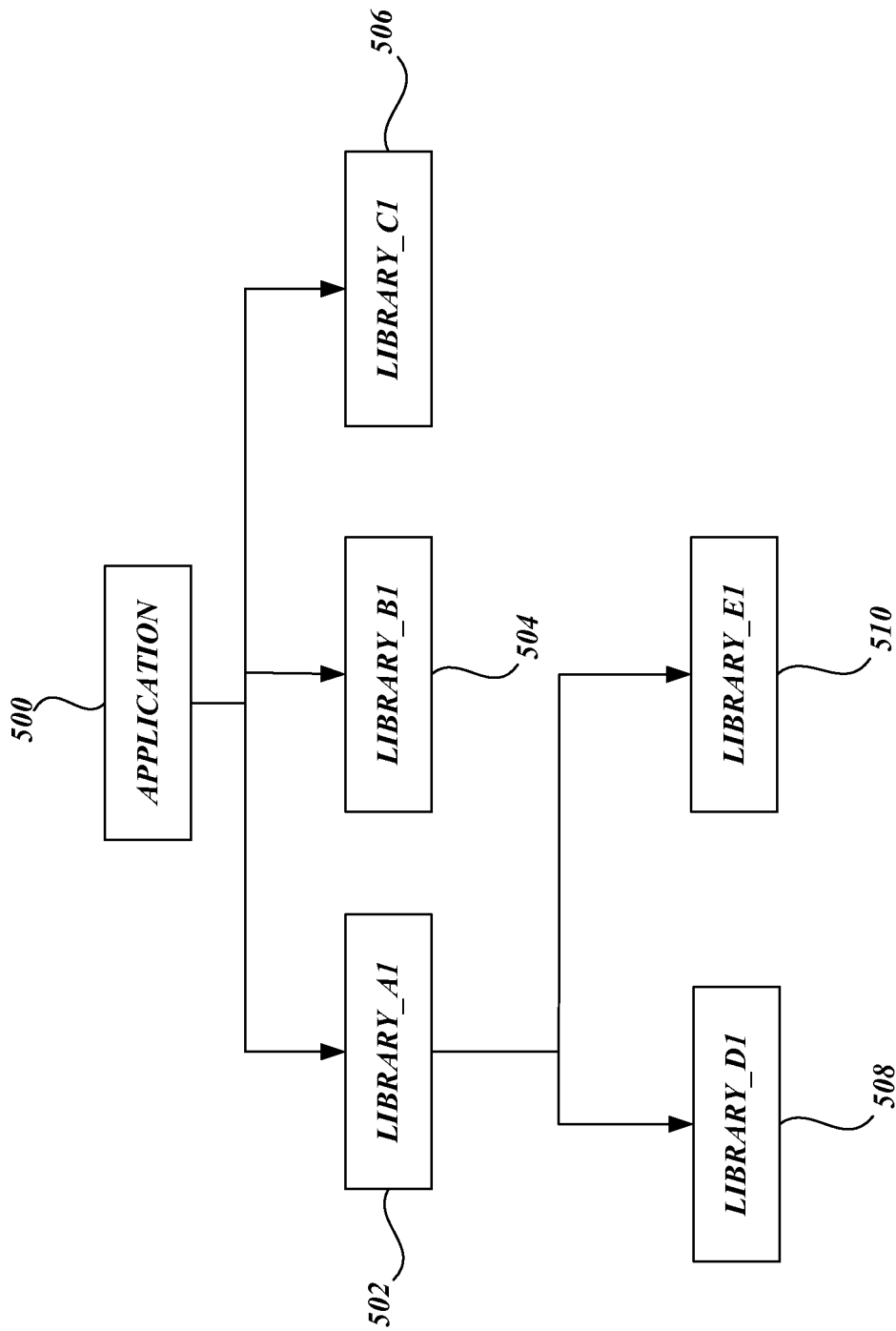
FIG. 5 is a block diagram of an exemplary dependency tree illustrating the dependency relationships of the elements shown in FIG. 4.

As FIG. 3 shows a library tree of the dependency relationships of the elements in FIG. 2, the block diagram of FIG. 5 shows a similar, albeit more complex, library tree of the dependency relationships of the elements in FIG. 4. Application 400, shown in FIG. 4, contains a function list 402 that contains three function pointers, i.e., pointers, library_A1:function_01 404, library_B1:function_01 406, and library_C1:function_01 408. Pointer library_A1:function_01 404 points to function_01 412 in library_A1 410. Pointer library_B1:function_01 406 points to function_01 422 in library_B1 420. Pointer library_C1:function_01 408 points to function_01 426 in library_C1 424. Hence, application 400 depends on, i.e., is supported by, library_A1 410, library_B1 420, and library_C1 424. The dependency relationships are shown in FIG. 5 by application 500 that is linked to library_A1 502, library_B1 504, and library_C1 506.

The library_A1 410, shown in FIG. 4, also contains a function list 414 that contains two pointers: library_D1:function_01 416 and library_E1:function_01 418. Pointer library_D1:function_01 416 points to function_01 430 in library_D1 428. Pointer library_E1:function_01 418 points to function_01 434 in library_E1 432. Hence, library_A1 410 directly depends on, and application 400 indirectly also depends on, library_D1 428 and library_E1 432. The direct dependency relationships are shown in FIG. 5 by the links between library_A1 502 and library_D1 508 and library_E1 510.

In practice, the dependency relationships between applications and libraries, such as the dependency relationships described above and illustrated in FIGS. 3 and 5, are influenced by how the applications and libraries are linked. For example, a library may support an application and the dependency between the application and the supporting library is influenced by how the application and supporting library are linked. Libraries may also support other libraries. Hence, the relationship between an application and a supporting library should be construed as exemplary and not limiting.

A statically linked supporting library is linked to the application at the time that the application is compiled and linked. In one type of static linking, the static library's entire executable image is linked into the application's executable image when the application is built, i.e., compiled and linked. In an alternative type of static linking, the application's executable image explicitly enumerates the dependencies and links of an "import library" for the supporting library. An import library is a library that helps automate the process of loading a shared library. Shared libraries are designed to be shared by more than one application, i.e., support more than one library. When a shared library is created, the compiler also creates an import library by the same name.

By compiling the import library into the application, the application is bound to the shared, i.e., supporting, library, which is loaded at run time by the operating system's loader. When the application is loaded, an import table is available in the application's executable image that the loader processes to locate the currently available version of the supporting library's executable image to load into the application's process.

A dynamically linked library, i.e., a dynamic library, is linked to the application during the execution of the application. A DLL is an exemplary dynamic library. While the application is running, the application makes a request to the operating system to load the dynamic library into the address space of the process. The running application may also make requests to unload and reload the dynamic library as many times as needed during the execution of the application.

In order for an application to locate functions in dynamic libraries, the application stores a function list or table, such as the function list 202 of application 200 shown in FIG. 2. When an application is loaded the function list in the application contains the expected addresses of the functions in the libraries. This expected list is generated using the import library. When the loader loads the actual libraries, the functions' addresses are likely to be different from the functions' addresses in the function list. Therefore, the loader updates, i.e., remaps, the functions' addresses in the function list. The process of remapping the functions' addresses is called "snapping" because the new addresses are "snapped" into place. Usually, after a library is loaded, the library needs to be initialized. Initialization prepares the library for use by external callers, e.g., applications. During initialization computing instructions are executed that, for example, build data structures in memory that are used by the library and perhaps insert default values in the data structures. The computing instructions for initialization may themselves call functions that are in libraries that need to be loaded and initialized. Load order, i.e., the order in which the libraries in a library tree are loaded, and initialization order, i.e., the order in which the libraries in a library tree are initialized, are determined.

An example of load order can be seen in the library tree illustrated in FIG. 5. The library tree shows that library_D1 508 and library_E1 510 are on the same level, i.e., same level of dependency, a level below the level of library_A1 502. Hence, it can be determined that library_D1 508 and library_E1 510 should be loaded before library_A1 502. Also note that because library_D1 508 and library_E1 510 are in the same level there is no dependency between the two libraries and thus library_D1 508 can be loaded before library_E1 510 or vice versa. Similarly, library_A1 502, library_B1 504, and library_C1 506 can be loaded in any order in relation to each other as long as library_A1 502 is loaded an after library_D1 508 and library_E1 510. It is also possible to load library_B1 504, library_C1 506, library_D1 508 and library_E1 510 in any order as long as the libraries are loaded before library_A1 502. That is, library_B1 504, library_C1 506, library_D1 508 and library_E1 510 form a "reference set." A reference set is a set of references of libraries that are not interdependent and thus, may be loaded together in any order.

Traditionally, loading and initializing libraries, including snapping, as described above is done in a linear fashion with no chronological overlap. That is, each library is completely loaded and initialized before starting the loading and initializing of the next library. Extending this tradition to the above mentioned example, library_E1 510 is loaded and initialized first; next, library_D1 508 is loaded and initialized; then library_C1 506, library_B1 504, and library_A1 502; and finally, the application 500 is loaded and initialized. Initialization for one library typically takes thousands to hundreds of thousands of clock cycles. Hence, while this linear step by step approach accomplishes library loading and initialization, the process is time consuming, often to the point of causing human-perceivable delays. Such delays become apparent during an application's startup, when libraries are first being loaded, and also during the execution of the application if libraries are dynamically unloaded and reloaded.

Speed can be increased by breaking the process of loading and initializing into smaller, independent tasks, and, as much as possible, executing the tasks in parallel. Even if one thread of execution operates on the tasks, a reasonable amount of time can be saved. If multiple threads and/or multiple processing units are used, a large amount of time can be saved. Because this technique can be used to load libraries using import tables at runtime, the bootup time of applications can be improved. Because this technique can be used during dynamic loading, the overall speed of applications can be improved. That is, because dynamic loading, which occurs while the application is running, can be sped up, the execution speed of the application is faster and the application becomes more responsive. Parallel library tree initialization, of which parallel DLL tree initialization is an implementation, is an example of such a process. The process and certain data structures used in the process are illustrated in FIGS. 6-14 and described below.

Parallel library tree initialization follows the library loading and initialization order of the libraries in each "level" of a library tree. A level in a library tree comprises the libraries that have the same level of dependency. For example, in the library tree shown in FIG. 5, library_D1 508 and library_E1 510 have the same dependency level and hence, may be loaded in any order in relation to each other. Preferably, the two libraries are loaded before the libraries on the level above, i.e., library_A1 502, library_B1 504, and library_C1 506. It is also possible to consider library_B1 504 and library_C1 506 to be on the same level as library_D1 508 and library_E1 510 because library_B1 504 and library_C1 506 do not support library_A1 502. After the library loading and initialization order are determined, the libraries in each level of a library tree can be initialized in parallel. As soon as the libraries in the level are loaded and initialized, the libraries in the next level up can be loaded and initialized.

Figure 6:
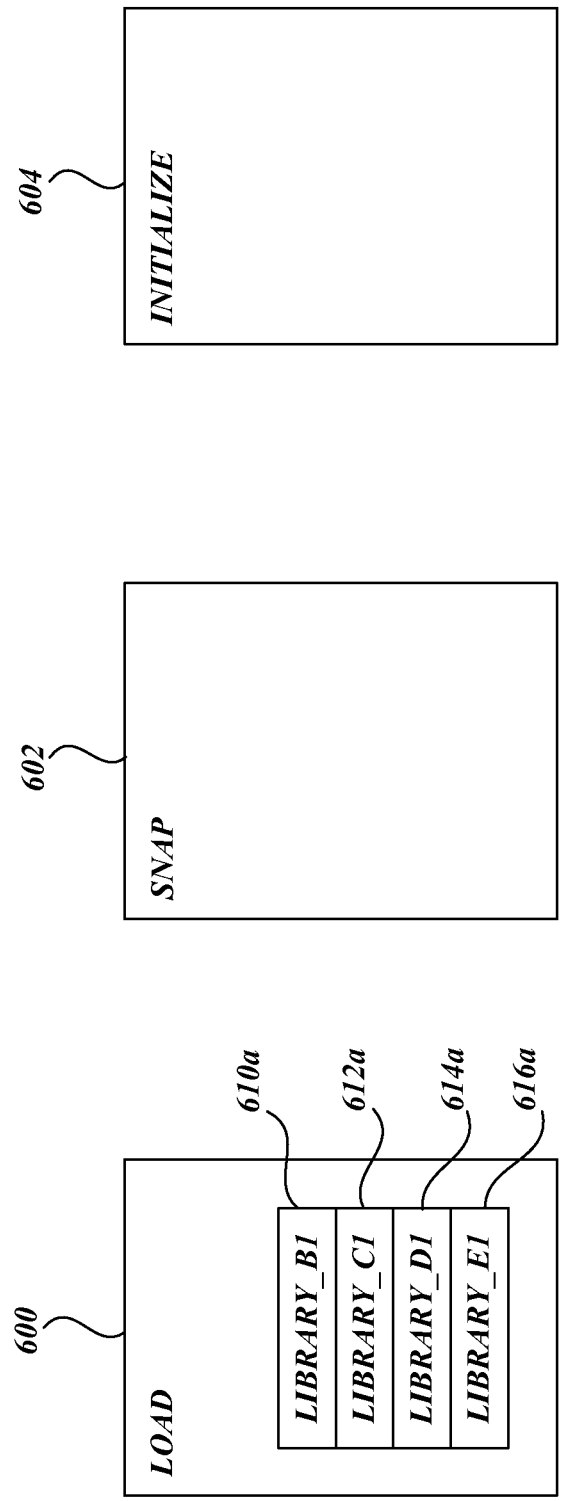
FIG. 6 is a pictorial diagram of an exemplary load queue containing four references and an exemplary snap queue and an exemplary initialize queue, both of which are empty.

The process of parallel library tree initialization comprises three stages: loading, snapping, and initialization. To support each stage, there is a corresponding queue: a load queue, a snap queue, and an initialize queue. FIG. 6 is a pictorial diagram that illustrates examples of these queues. FIGS. 6-9 show how these exemplary queues are used to load the exemplary libraries of the exemplary library tree shown in FIG. 5. When the parallel library tree initialization process begins, the load queue 600 contains references, e.g., pointers, for libraries in the first loadable level of the library tree. For example, the load queue 600 contains a reference for library_B 1 504, shown in FIG. 5. Library_B1 504, which is shown in FIG. 6 in position library_B1 610a. Similarly, positions library_C1 612a, library_D1 614a, and library_E1 616a are shown for library_C1 506, library_D1 508, and library_E1 510 references, respectively. The exemplary snap queue 602 and the exemplary initialize queue 604 are empty. As each library is loaded, the reference for the loaded library is moved from the load queue 600 to the snap queue 602.

Figure 7:
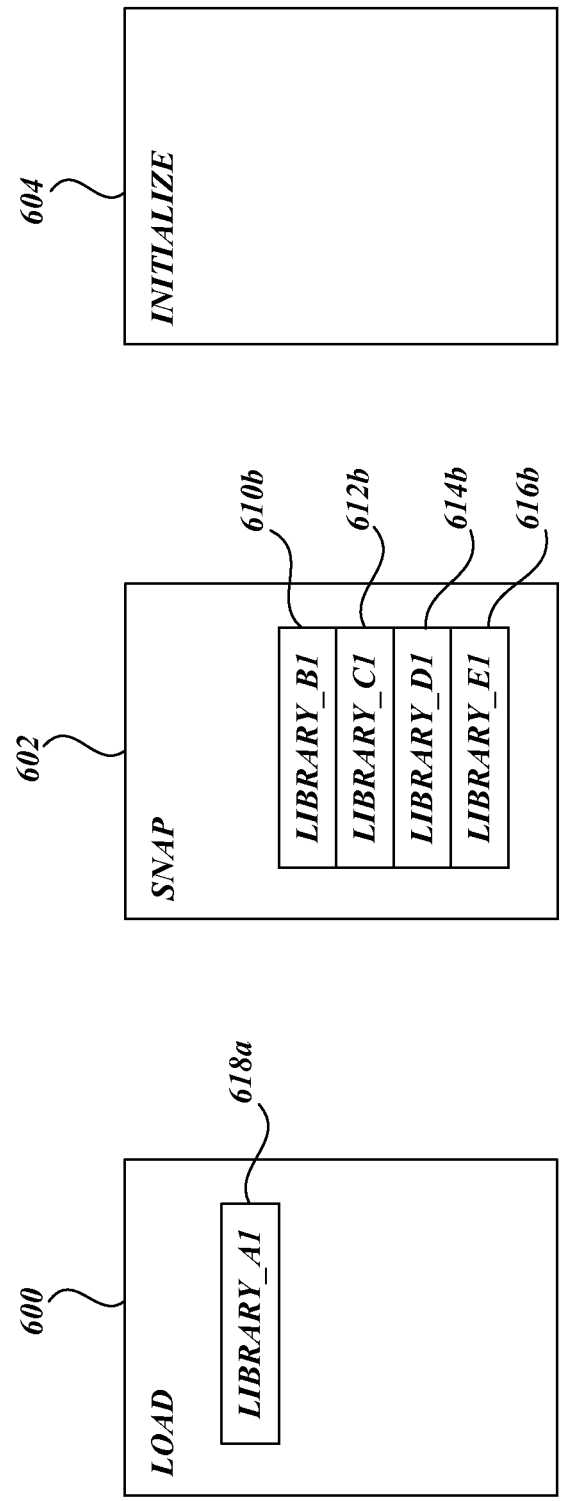
FIG. 7 is a pictorial diagram of the exemplary queues shown in FIG. 6 with the exemplary load queue containing one reference, the exemplary snap queue containing four references, and the exemplary initialize queue containing no references.

FIG. 7 shows the snap queue 602 after library_B1 504, library_C1 506, library_D1 508, and library_E1 510 have been loaded and their references moved into the snap queue 602. In particular, the references are moved to positions library_B1 610b, library_C1 612b, library_D1 614b, and library_E1 616b. Because the libraries on the level below library_A1 502 have been loaded, a reference for library_A1 is shown moved into position library_A1 618a in the load queue 600. In FIG. 7, the initialize queue 604 is empty. As each library in the snap queue 602 is loaded, the reference for each library is moved from the snap queue 602 to the initialize queue 604.

Figure 8:
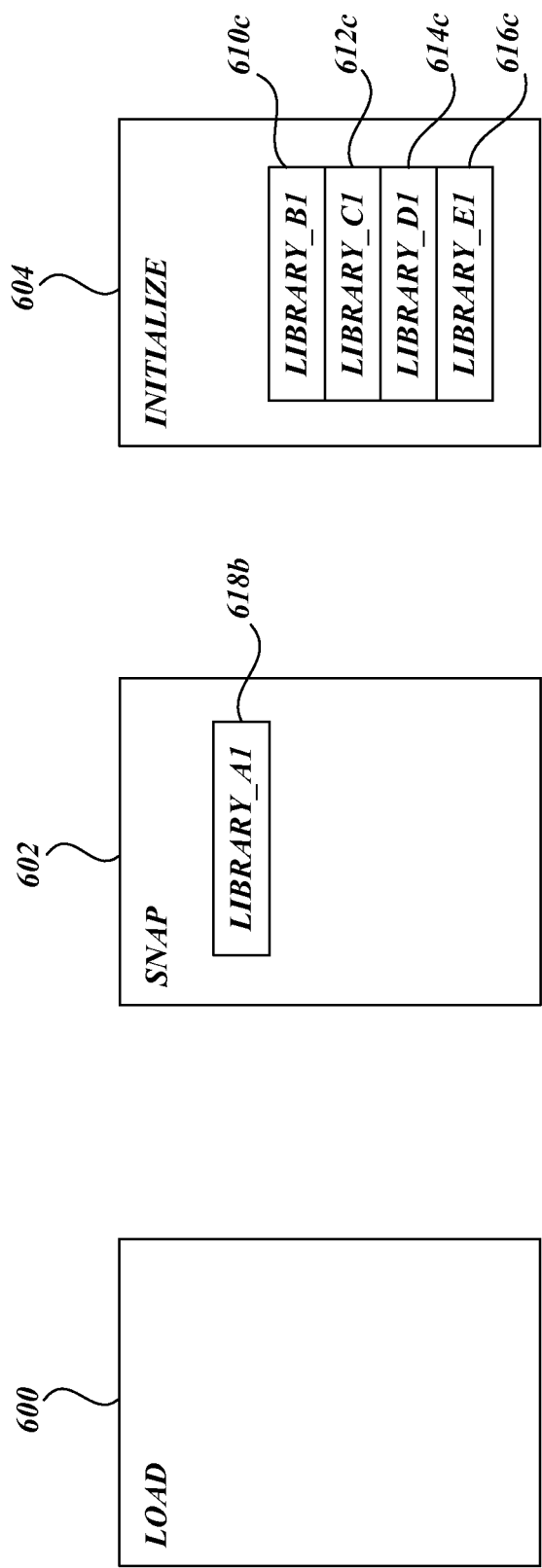
FIG. 8 is a pictorial diagram of the exemplary queues shown in FIG. 6 with the exemplary load queue containing no references, the exemplary snap queue containing one reference, and the exemplary initialize queue containing four references.

FIG. 8 shows the initialize queue 604 after library_B1 504, library_C1 506, library_D1 508, and library_E1 510 have been loaded and their references moved into the initialize queue 604. In particular, the references are moved to positions library_B1 610c, library_C1 612c, library_D1 614c, and library_E1 616c. Because the libraries on the level below library_A1 502 have been snapped, the reference for library_A1 is moved into position library_A1 618b in the snap queue 602 leaving the load queue 600 shown in FIG. 8 empty.

Figure 9:
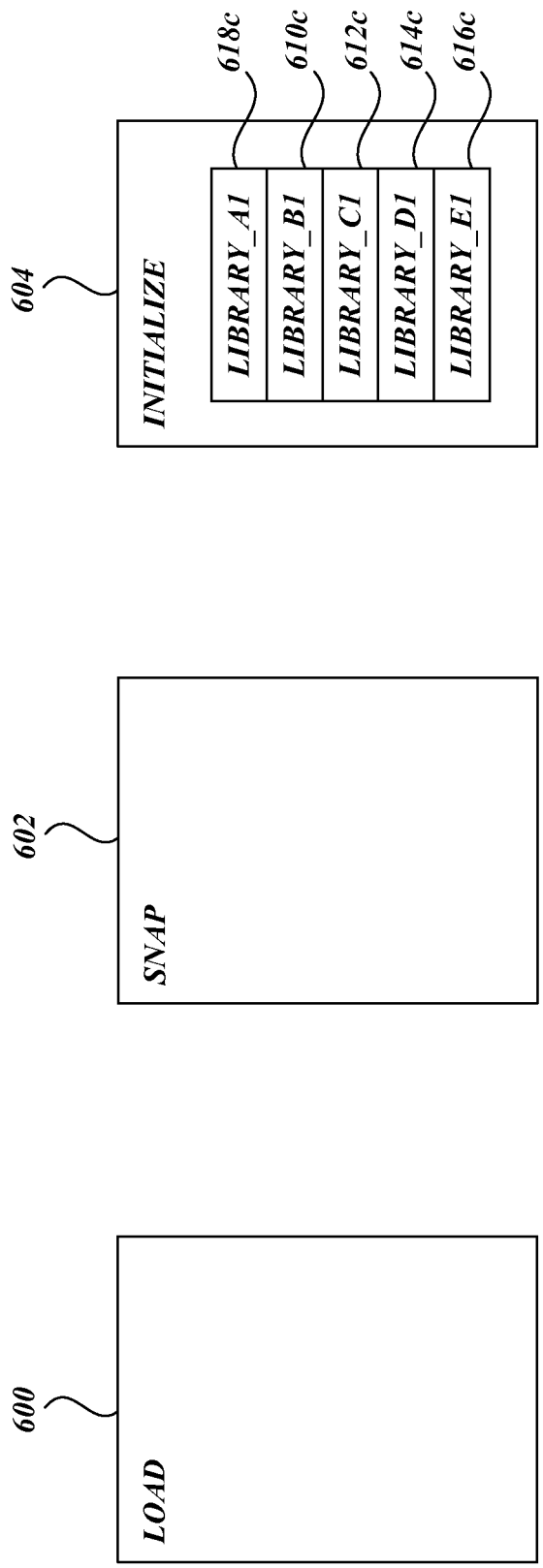
FIG. 9 is a pictorial diagram of the exemplary queues shown in FIG. 6 with the exemplary load queue and snap queue being empty and the exemplary initialize queue containing five references.

FIG. 9 shows the initialize queue 604 after library_A1 502 has been snapped and the reference for library_A1 502 moved into the initialize queue 604 leaving the load queue 600 and the snap queue 602 empty. As shown in FIG. 9, the references are in positions library_A1 618c, library_B1 610c, library_C1 612c, library_D1 614c, and library_E1 616c. Each library reference can be removed from the initialize queue 604 after each library is initialized. The "snapshots" provided by FIGS. 6-9 pictorially show how the libraries in one exemplary library tree are loaded, snapped, and initialized. The functional flow diagrams of FIGS. 10-14 illustrate the parallel library tree initialization process in more detail.

Figure 10:
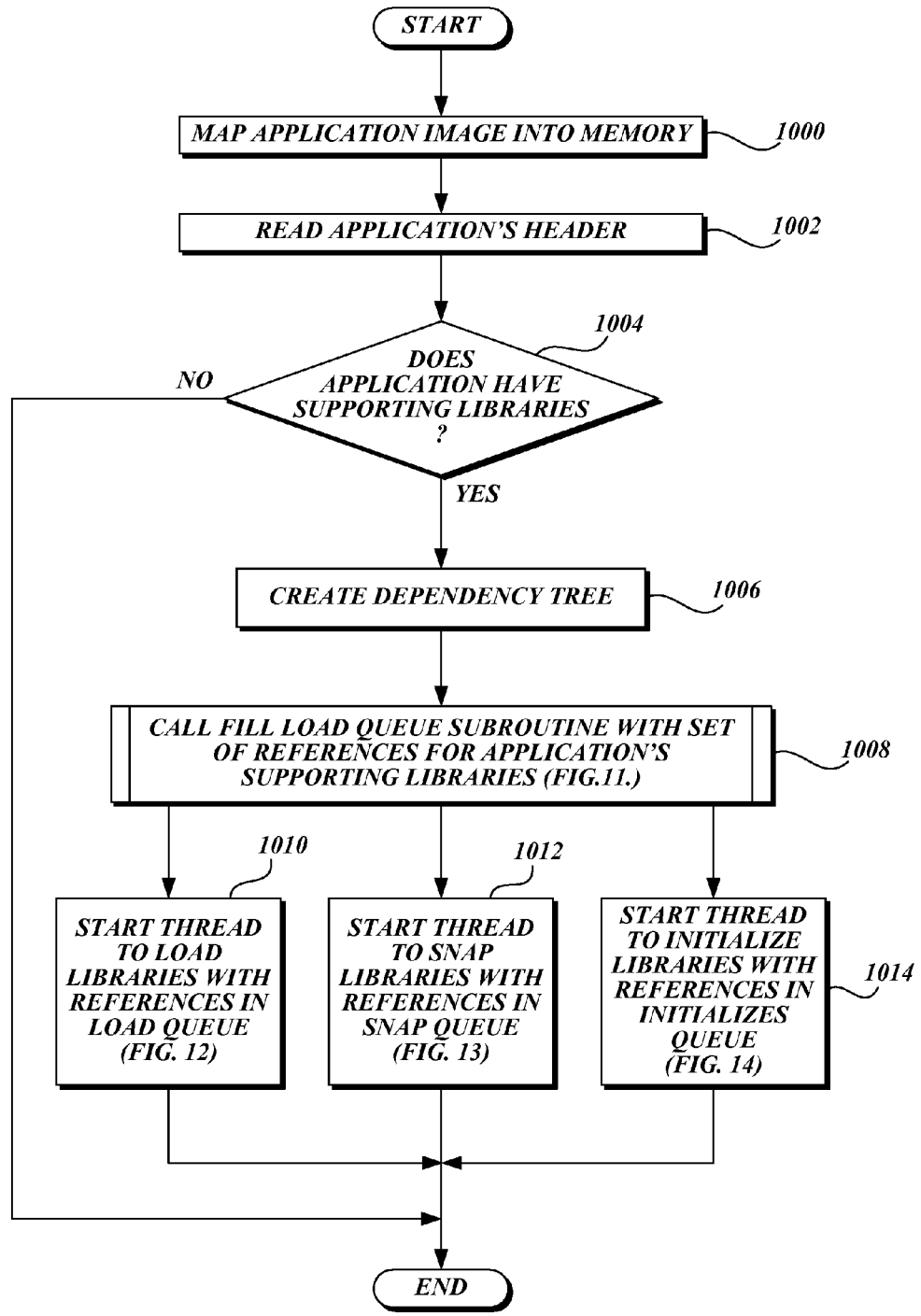
FIG. 10 is a functional flow diagram illustrating an exemplary asynchronous process for loading an exemplary application and the application's exemplary supporting libraries.

FIG. 10 is a functional flow diagram illustrating an exemplary parallel library tree initialization process for initializing libraries that support an application. The process progresses from identifying the libraries that support the application to determining an initialization order for the supporting libraries and finally to initializing the libraries in asynchronous stages. The process begins at block 1000 in which a exemplary loader maps an application image into memory. Software modules other than a loader may be used to map an application image into memory and to perform other actions in the process. Hence, the use of a loader for performing actions in the process should be construed as exemplary and not limiting. At block 1002, the loader reads the application's header. A header typically contains information about the size of the library, the library's contents, and so on that enable the loader to load the library. At decision block 1004, a test is made to determine if the application has supporting libraries. If the application does not have supporting libraries, the process ends. If the application does have supporting libraries, the control flows to block 1006 where the loader creates a dependency tree, e.g., a library tree. The library tree is formed from the references of the supporting libraries. Reference sets may then be formed and a load order for the reference sets in the library tree may be determined according to the levels of the reference sets remaining in the library tree.

Figure 11:
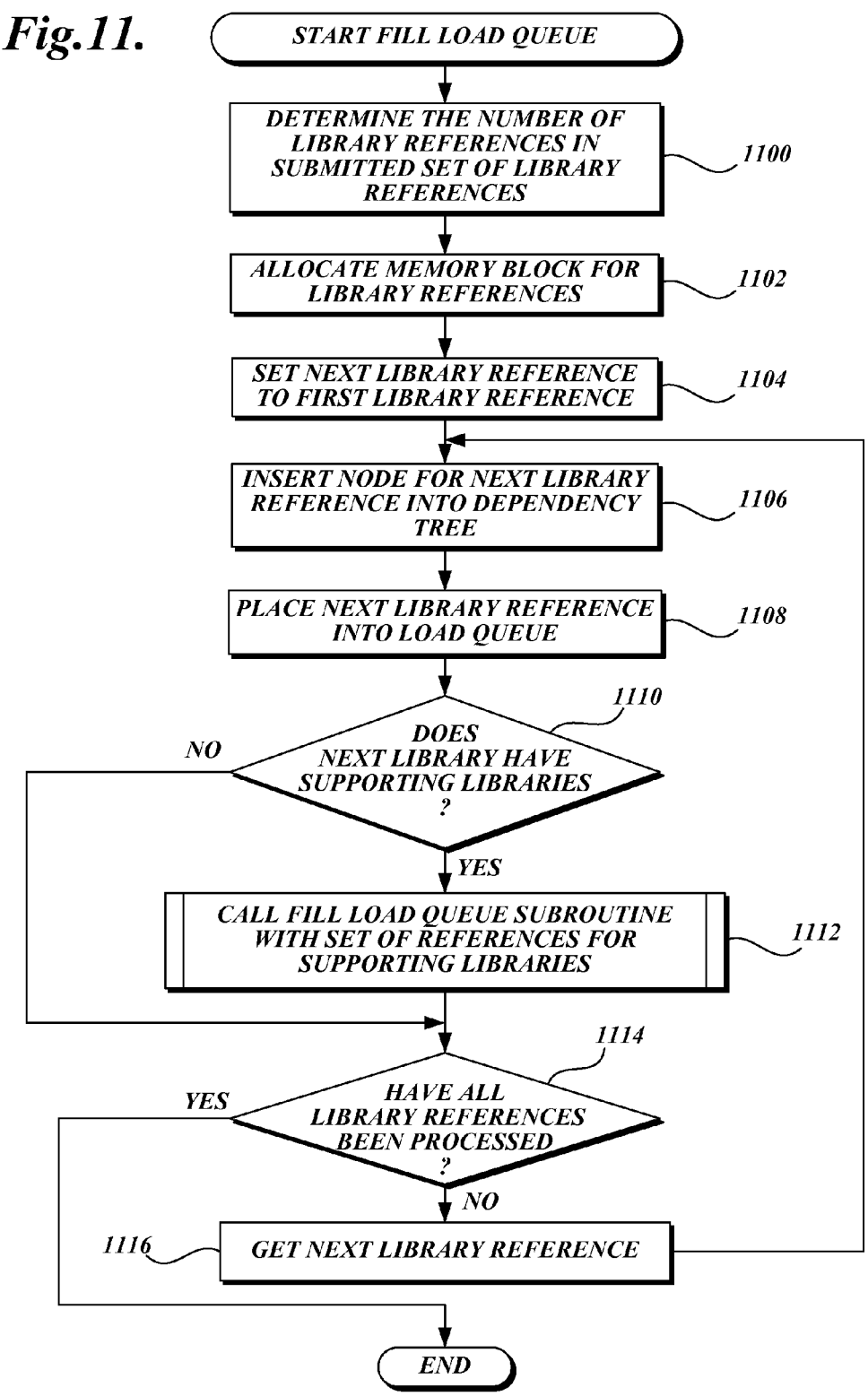
FIG. 11 is a functional flow diagram illustrating an exemplary subroutine for filling an exemplary load queue with references and which is suitable for using within the asynchronous process shown in FIG. 10.

Continuing with FIG. 10, at block 1008, the loader calls an exemplary fill load queue subroutine with a set of references for the application's supporting libraries. An exemplary fill load queue subroutine is illustrated in FIG. 11 and described below. After the fill load queue subroutine called in block 1008 has executed, the control flow is separated into three exemplary asynchronous branches representing three asynchronous stages. It is preferable to take advantage of the asynchronous nature of the stages and allow the stages to be executed in parallel. The control flow branches to blocks 1010, 1012, and 1014. At block 1010, the loader starts a thread to load libraries with references in the load queue, e.g., the load queue 600 shown in FIG. 6. At block 1012, the loader starts a thread to snap libraries with references in the snap queue, e.g., the snap queue 602 shown in FIG. 6. At block 1014, the loader starts a thread to initialize libraries with references in the initializes queue, e.g., the initialize queue 604 shown in FIG. 6.

Figure 12:
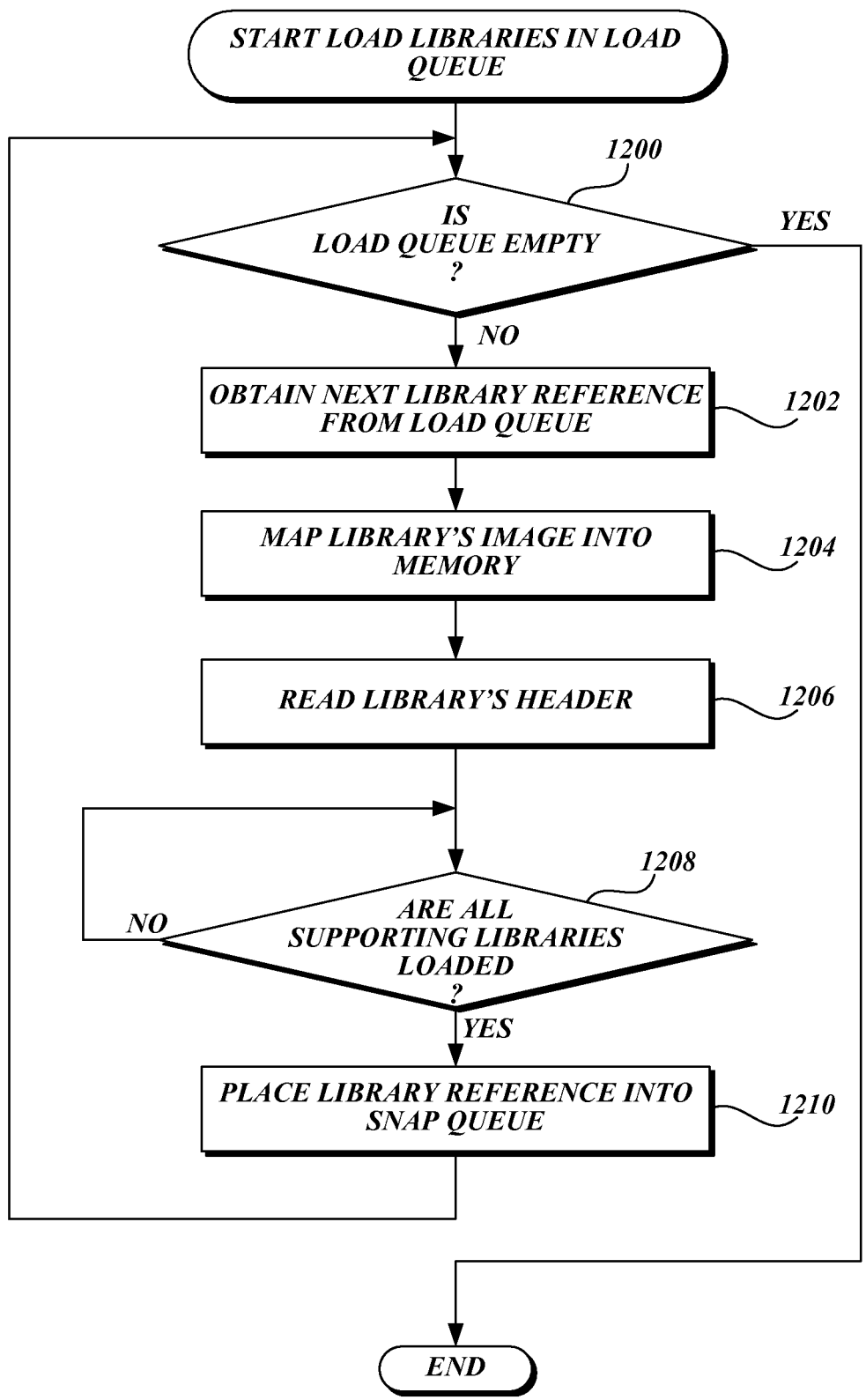
FIG. 12 is a functional flow diagram illustrating an exemplary subroutine for loading libraries using references stored in an exemplary load queue.
Figure 13:
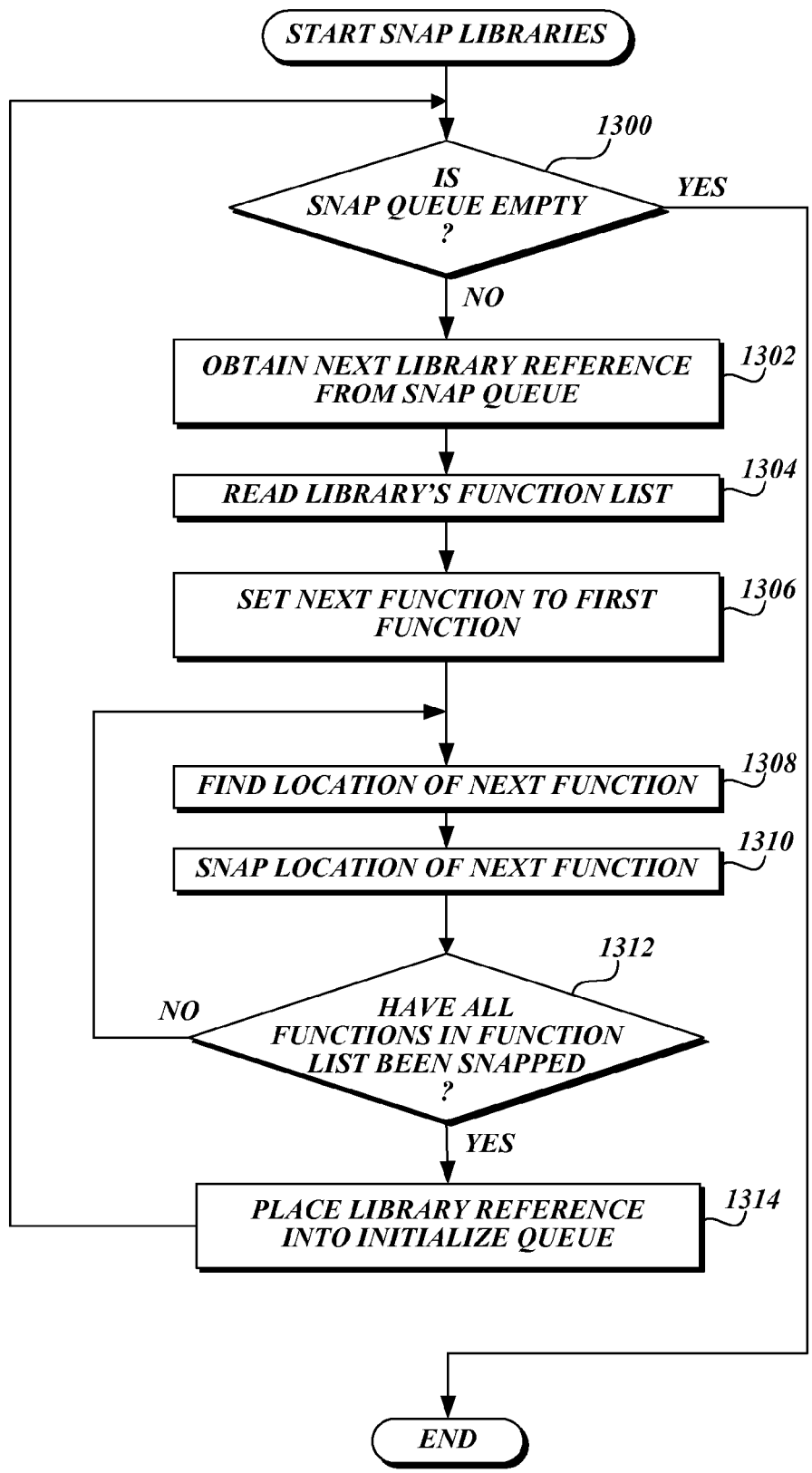
FIG. 13 is a functional flow diagram illustrating an exemplary subroutine for staffing libraries using references stored in an exemplary snap queue.
Figure 14:
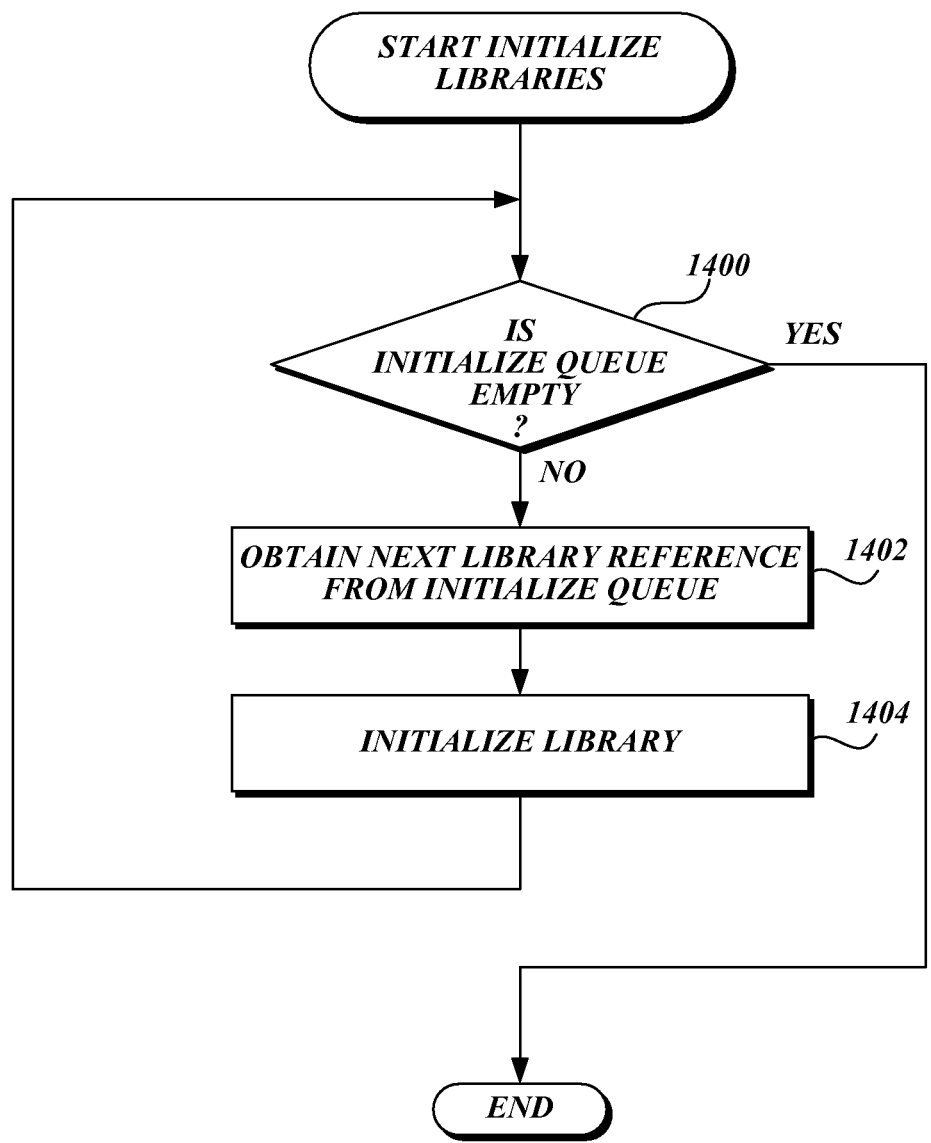
FIG. 14 is a functional flow diagram illustrating the exemplary subroutine for initializing libraries using references stored in an exemplary initialize queue.

As illustrated in FIGS. 6-9 and described above, each library reference, i.e., reference, is placed in the load queue 600. Each library is loaded and the reference for the library is removed from the load queue 600 and placed in the snap queue 602. Once a library is loaded, all of its supporting libraries must be loaded before the library's reference can be placed on the snapped queue 602. A way of determining if all of the supporting libraries are loaded is to use a count of the supporting libraries. When a supporting library is loaded, the count is decremented. When the count is decremented to zero, the library's reference is placed on the snapped queue 602. Each library is snapped and the reference for the library is removed from the snap queue 602 and placed in the initialize queue 604. After a library for a reference is initialized, the reference is removed from the initialize queue 604. Once a library is snapped, all of its supporting libraries must be snapped before the library's reference can be placed on the initialize queue 604. A way of determining if all of the supporting libraries are snapped is to use a count of the supporting libraries. When a supporting library is snapped, the count is decremented. When the count is decremented to zero, the library's reference is placed on initialize queue 604. When the actions in blocks 1010, 1012, and 1014 have completed, the process ends. Exemplary subroutines for carrying out the functions of blocks 1010, 1012, and 1014 are illustrated in FIGS. 12, 13, and 14, respectively, and described below.

The parallel execution of the actions in blocks 1010, 1012, and 1014 shown in FIG. 10 may be accomplished in many ways. For example, one thread, instead of the three exemplary threads stated in blocks 1010, 1012, and 1014, may execute the three actions. It is also possible for two, four, or more properly coordinated threads to execute the actions. Hence the use of three threads, one each for blocks 1010, 1012, and 1014, should be construed as exemplary and not limiting. Also, the thread, or threads, of the exemplary process illustrated in FIG. 10 and described above may be run on one or more processors.

As described above, at block 1008 of FIG. 10, the loader calls an exemplary fill load queue subroutine with a set of references for the application's supporting libraries. An exemplary fill load queue subroutine is illustrated in FIG. 11. FIG. 11 is a functional flow diagram illustrating an exemplary subroutine for filling an exemplary load queue, e.g., the load queue 600 shown in FIG. 6, with library references, i.e., references, and which is suitable for using within the exemplary parallel library tree initialization process shown in FIG. 10. Note that the subroutine shown in FIG. 11 is represented as a recursive function, i.e., a function that calls itself. While using recursion often makes designing and explaining a function easier, recursive functions are sometimes difficult to implement safely and efficiently. Thus, while the subroutine shown in FIG. 11 is represented as recursive for ease of explanation, it is to be understood that this subroutine can also be implemented in a non-recursive fashion.

The exemplary fill load queue subroutine begins at block 1100 in which the number of library references in the submitted set of library references is determined. At block 1102, a memory block is allocated for the library references. At block 1104, the next library reference, i.e., the next library reference to be processed, is set to the first library reference. At block 1106, a node is created for the next library reference and the node for the next library reference is inserted into the dependency tree, i.e., library tree. At block 1108, the next library reference is placed into the load queue, e.g., the load queue 600 shown in FIG. 6. At decision block 1110, a test is made to determine if the next library, i.e., the library being processed, has supporting libraries. If the next library does not have supporting libraries, control flows to decision block 1114. If the next library does have supporting libraries, control flows to block 1112 in which a call, i.e., a recursive call, is made to the subroutine for the fill load queue subroutine with a set of references for supporting libraries, i.e., the supporting libraries of the library being processed. At decision block 1114, a test is made to determine if all the library references have been processed. If all of the library references, i.e., the library references in the set of references being processed, have not been processed, control flows to block 1116 where the next library reference is obtained and control flow then continues with block 1106. If all of the library references in the set of references being processed have been processed, the process ends.

In block 1010, shown in FIG. 10, a thread is started to load libraries using the references stored in a load queue, e.g., the load queue 600 shown in FIG. 6. An exemplary subroutine for loading libraries using references stored in an exemplary load queue is illustrated by a functional flow diagram shown in FIG. 12. The exemplary subroutine begins at block 1200 where a test is made to determine if the load queue, e.g., the load queue 600 shown in FIG. 6, is empty. If the load queue is empty, the process ends. If the load queue is not empty, control flows to block 1202 in which the next library reference from the load queue is obtained. The library reference is used to read a library's image and, at block 1204, the library's image is mapped into memory. At block 1206, the library's header is read. At decision block 1208, a test is made to determine if all the supporting libraries, i.e., the libraries supporting the library being processed, are loaded. Typically, the library may be inspected after the load completes to see if the library can be snapped. Alternatively, as each supporting library is loaded, the portion of the library's import table containing the supporting libraries can be snapped. If all the supporting libraries are loaded, control flows to block 1210. At block 1210, the library reference is placed into the snap queue. If all the supporting libraries have not loaded, the control flows back to decision block 1208. The process continues until the load queue is empty as determined by the test made in decision block 1200.

In block 1012, shown in FIG. 10, a thread is started to snap libraries using the references stored in a snap queue, e.g., the snap queue 602 shown in FIG. 6. An exemplary subroutine for snapping libraries using the references stored in an exemplary snap queue is illustrated by a functional flow diagram shown in FIG. 13. The exemplary subroutine begins at decision block 1300 where a test is made to determine if the snap queue, e.g., the snap queue 602 shown in FIG. 6, is empty. If the snap queue is empty, the process ends. If the snap queue is not empty, control flows to block 1302. At block 1302, the next library reference is obtained from the snap queue. The library reference is used to locate a library and, at block 1304, the library's function list is read. At block 1306, the next function, i.e., the next function to be processed, is set to the first function. At block 1308, the location of the next function is found. At block 1310, the location of the next function is snapped. At decision block 1312, a test is made to determine if all the functions in the function list have been snapped. If all the functions in the list have not been snapped, control flows back to block 1308. If all the functions in the function list have been snapped, control flows to block 1314 where the library reference is placed into the initialize queue, e.g., the initialize queue 604 shown in FIG. 6. Typically, the library may be inspected after the snapping completes to see if the library can be initialized. Alternatively, as each supporting library is snapped, the portion of the library's import table containing the supporting libraries can be initialized. The process continues until the snap queue is empty as determined by the test made in decision block 1300.

In block 1014, shown in FIG. 10, a thread is started to initialize libraries using the references stored in an initialize queue, e.g., the initialize queue 604 shown in FIG. 6. An exemplary subroutine for initializing libraries using the references stored in an exemplary initialize queue is illustrated by a functional flow diagram shown in FIG. 14. The exemplary subroutine begins at decision block 1400 where a test is made to determine if the initialize queue, e.g., the initialize queue 604 shown in FIG. 6, is empty. If the initialize queue is empty, the process ends. If the initialize queue is not empty, the control flows to block 1402 where the next library reference is obtained from the initialize queue. The library reference is used to locate a library and, at block 1404, the library is initialized. The process continues until the initialize queue is empty as determined by the test made in decision block 1400.

While the parallel library tree initialization process illustrated in FIGS. 10-14 and described above has obvious time saving advantages when used in computing devices or systems with multiple processors, single processor computer devices can also benefit from using the process. As long as a computing system or device uses more than one thread to perform loading, snapping, and initialization, delays can be reduced. For example, if a thread that is performing snapping is blocked, threads performing loading and initialization can continue. Another advantage of the parallel library tree initialization process is that an operating system can safely load applications without the explicit cooperation of the applications. Similarly, applications that run on the operating system need not be written with knowledge of how the operating system loads the applications.

While illustrative embodiments have been illustrated and described, it will be appreciated that various changes can be made therein without departing from the spirit and scope of the invention. For example, it is possible to unload libraries using a process similar to the one described above.

The embodiments of the invention in which an exclusive property or privilege is claimed are defined as follows:

1. A method for processing a plurality of libraries in parallel, comprising:
   identifying a first library that comprises a first function used by an application;
   identifying a second library that comprises a second function supporting the first library;
   loading the second library into first memory; and
   snapping the second library to remap an address of the second function while concurrently loading the first library into second memory.

2. The method of claim 1, comprising:
   initializing the second library while concurrently snapping the first library to remap an address of the first function.

3. The method of claim 1, the identifying a second library comprising:
   identifying the second library prior to beginning to load the first library into the second memory.

4. The method of claim 1, the loading the second library comprising:
   identifying a reference associated with the second library in a load queue.

5. The method of claim 4, the snapping comprising:
   identifying the reference in a snap queue.

6. The method of claim 5, comprising:
   initializing the second library in response to moving the reference from the snap queue to an initialization queue.

7. The method of claim 1, comprising:
   developing a dependency tree describing a dependency between the first library and the second library.

8. A system for processing a plurality of libraries in parallel, comprising:
   one or more processing units; and
   memory comprising instructions that when executed by at least some of the one or more processing units perform operations comprising:
   identifying a first library that comprises a first function used by an application;
   identifying a second library that comprises a second function supporting the first library;
   loading the second library into first memory; and snapping the second library to remap an address of the second function while concurrently loading the first library into second memory.

9. The system of claim 8, the loading the second library comprising:
   loading the second library prior to beginning to load the first library.

10. The system of claim 8, the first library associated with a counter describing a number of libraries, supporting the first library, to be loaded.

11. The system of claim 10, the operations comprising:
   altering a count of the counter in response to the loading the second library.

12. The system of claim 11, the loading the first library comprising:
   loading the first library when the count is equal to a desired value.

13. The system of claim 8, the second library associated with a reference and the operations comprising:
   moving the reference from a load queue to a snap queue in response to the loading the second library.

14. The system of claim 8, the operations comprising:
   initializing the second library while concurrently snapping the first library to remap an address of the first function.

15. The system of claim 8, the operations comprising:
   generating a list describing a dependency between the first library and the second library.

16. A computer-readable storage device comprising computer-executable instructions that when executed perform a method, comprising:
   identifying a first library that comprises a first function used by an application;
   identifying a second library that comprises a second function supporting the first library;
   loading the second library into first memory; and
   snapping the second library to remap an address of the second function while concurrently loading the first library into second memory.

17. The computer-readable storage device of claim 16, the loading the second library comprising:
   loading the second library prior to beginning to load the first library.

18. The computer-readable storage device of claim 16, the first function comprising a set of computer instructions for performing a particular task.

19. The computer-readable storage device of claim 16, the first library associated with a counter describing a number of libraries, supporting the first library, to be loaded.

20. The computer-readable storage device of claim 19, the method comprising:
   altering a count of the counter in response to the loading the second library.

* * * * *